(12) United States Patent
Clancy et al.

(10) Patent No.: US 6,373,073 B1
(45) Date of Patent: Apr. 16, 2002

(54) MULTIPLE SPECTRAL BAND OPTO-MECHANICAL MODULAR

(75) Inventors: Thomas M. Clancy, Nashua, NH (US); Eugene S. Rubin, Waban, MA (US)

(73) Assignee: Bae Systems Information and Electronic Systems Integration, Inc. USA., Nashua, NH (US)

( * ) Notice: Subject to any disclaimer, the term of this patent is extended or adjusted under 35 U.S.C. 154(b) by 0 days.

(21) Appl. No.: 05/373,237

(22) Filed: Jun. 25, 1973

Related U.S. Application Data

(63) Continuation-in-part of application No. 05/300,538, filed on Oct. 25, 1972, now abandoned.

(51) Int. Cl.[7] .......................... G01N 1/00; G02B 26/02
(52) U.S. Cl. .................. 250/504 R; 359/232; 359/235
(58) Field of Search .................. 350/272, 274, 350/316; 356/78, 188; 250/339, 344, 233, 236, 494.1, 504 R, 495.1, 503.1; 359/232, 235, 236

(56) References Cited

U.S. PATENT DOCUMENTS

| 2,972,282 A | 2/1961 | Försterling et al. ......... 350/316 |
| 3,023,661 A | 3/1962 | McClusky et al. .......... 356/188 |

*Primary Examiner*—Stephen C. Buczinski
(74) *Attorney, Agent, or Firm*—Scott J Adams; Vernon C Maine

(57) ABSTRACT

A multiple spectral band opto-mechanical modulator for obtaining simultaneous but independent modulation of an extended IR source in two distinct wavelength bands comprises in one embodiment a first rotating filter wheel having alternating radial segments of transparent and short wavepass filter material, a second rotating filter wheel having alternating radial segments of transparent and long wavepass filter material, a stationary wheel having alternating radial transparent and opaque segments positioned intermediate the first and second rotating wheels and means for rotating said first and second filter wheels at predetermined frequencies.

12 Claims, 5 Drawing Sheets

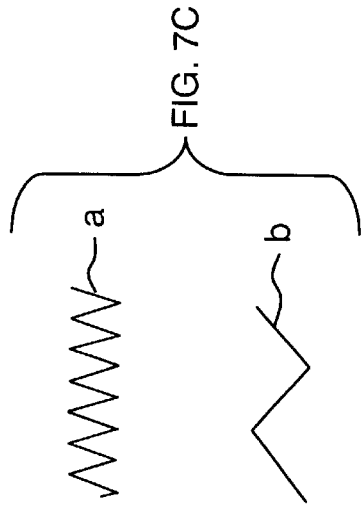
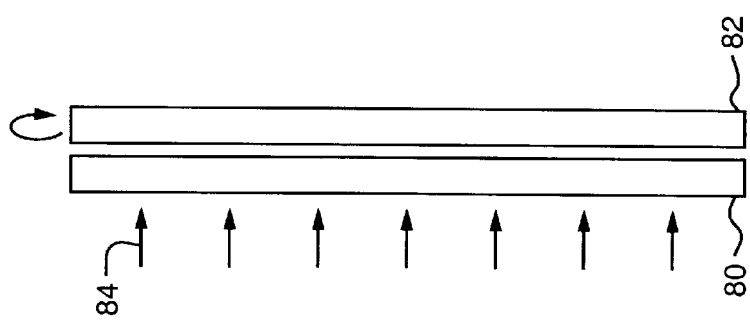
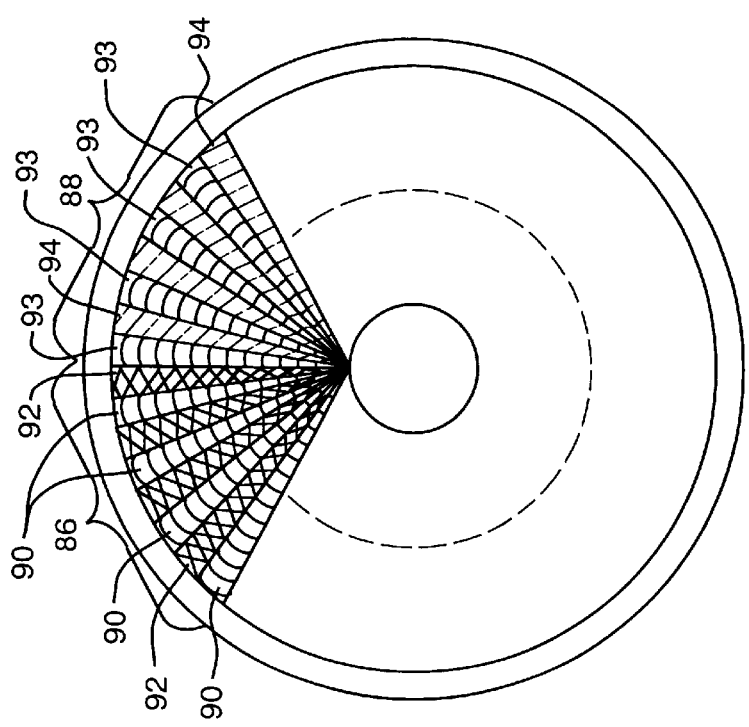

MULTIPLE SPECTRAL BAND OPTO-MECHANICAL MODULAR

This application is a continuation in part of my application also entitled Multiple Spectral Band Opto-Mechanical Modulator, Ser. No. 05/300,538, filed Oct. 25, 1972, now abandoned.

BACKGROUND OF THE INVENTION

Prior to the present invention modulation of a large aperture radiation source was achieved by placing in front of such source a rotating and stationary wheel of alternating opaque and transparent radial segments. In this arrangement all wavelengths are modulated with the same temporal waveform. For certain applications it is necessary to modulate a single radiation source to provide simultaneously distinct outputs in different spectral regions and at different pulse repetition frequencies.

SUMMARY OF THE INVENTION

Accordingly, it is an object of this invention to provide a new and novel mechanical modulator.

It is another object of this invention to provide a mechanical modulator to obtain simultaneously but independently radiation in distinct spectral regions at different pulse repetition frequencies.

Briefly, in one embodiment a mechanical modulator which provides simultaneously two distinct signals in two spectral regions at different pulse repetition frequencies includes three wheels: a first filter wheel rotating at a first velocity having first and second alternating radial segments, said first segments being transparent at both spectral regions and said second segments being transparent at the shorter of the two spectral regions and opaque at the longer; a second filter wheel rotating at a second velocity having first and second alternating radial segments, said first segments being transparent at both spectral regions and said second segments being transparent at the longer of the two spectral regions and opaque at the shorter; and a third wheel which is stationary, also having first and second alternating radial segments, said first segments being transparent at both spectral regions and said second segments being opaque at both spectral regions. This third wheel is arranged intermediate the first and second filter wheels. When the rotating filter wheels are spun past the stationary wheel modulation is obtained in that spectral region where the segments are opaque; the first filter wheel modulates the longer wavelengths and vice versa.

If desired, additional modulating wheels or other types of modulators may be used to superimpose modulation on the outputs from the aforementioned modulator.

BRIEF DESCRIPTION OF THE DRAWINGS

The above-mentioned and other features and objects of this invention will become more apparent by reference to the following description taken in conjunction with the accompanying drawings, in which:

FIGS. 7A–7C are sketches illustrating an alternative modulator requiring only two wheels.

DESCRIPTION OF PREFERRED EMBODIMENTS

Figure 1:
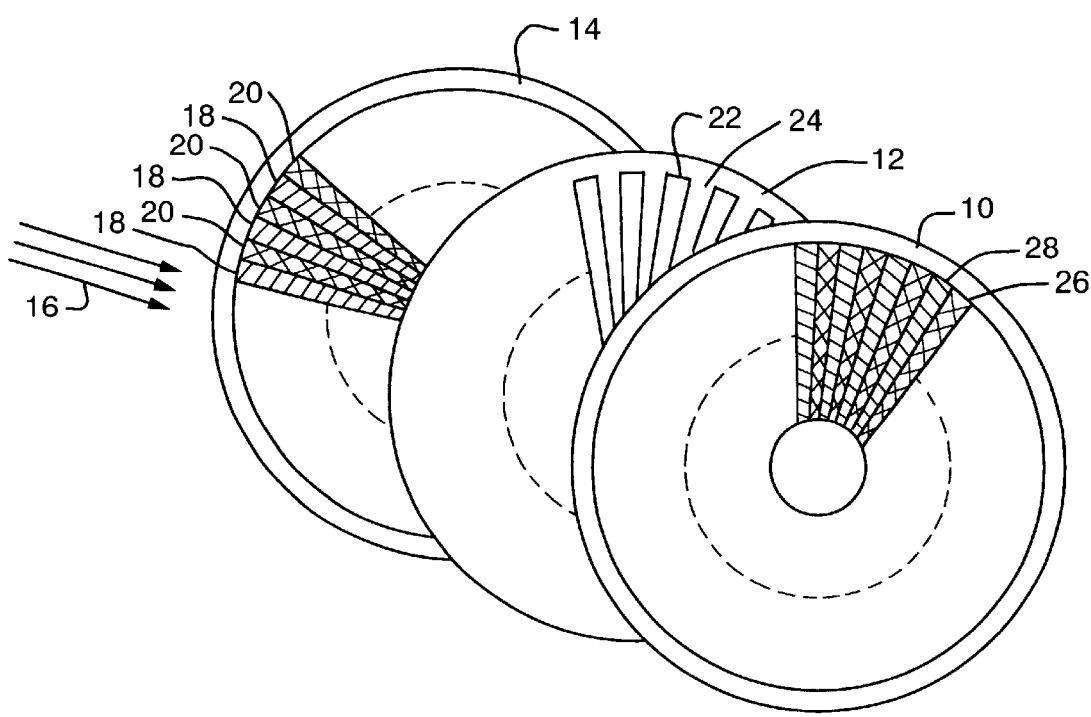
FIG. 1 is a sketch of a three wheel modulator of utility in the practice of the present invention.

Referring now to FIG. 1, there is illustrated thereby a first embodiment of a mechanical modulator which provides simultaneously but independent modulation of a radiation source in two distinct spectral wavelength bands ($\Delta\lambda_1$ and $\Delta\lambda_2$). The modulator comprises three wheels 10, 12 and 14 having substantially identical segments thereon. Wheels 10 and 14 are rotating filter wheels while wheel 12 is a stationary wheel. For clarity and purposes of illustration, the means for rotating filter wheels 10 and 14 which are for holding the wheels in a fixed relationship to each other, are not shown in this FIG. (see FIG. 6). The wheels are normally maintained next to a source of radiation (not shown). The wheels are spaced as close to each other as physically practical in order to minimize waveguiding effects and direct radiation at large field angles. The radiation 16 impinges on filter wheel 14 first in this embodiment, however, in alternate embodiments the arrangement could be reversed with wheel 10 positioned adjacent the source of radiation.

Filter wheel 14 is made up of alternate radial segments 18 and 20. Segments 18 are transparent to both spectral wavelength bands of interest. Segments 20 have a transmission characteristic substantially as shown in diagram A of FIG. 2, that is, over the band shown as $\Delta\lambda_1$ substantial amounts of radiation will pass through these segments while radiation of longer wavelengths will be blocked thereby.

Filter wheel 14 is made of a material which will pass the desired bands. Quartz, glass, sapphire, or silicon, for example, could be used depending on the bands of interest. The segments 20 are constructed by a deposition of filter material on one side of the filter wheel 14. Such filter material will have the transmission characteristics as shown in diagram A of FIG. 2. The filter materials can be evaporated on by a vacuum deposition process. Dielectric multi-layer interference type filters have been deposited on a substrate with success.

Filter wheel 12 is made up of alternate radial segments 22 and 24. Segments 22 are transparent to both spectral wavelength bands of interest and segments 24 are opaque thereto. Preferably filter wheel 12 is a metal disc having slots 22 therein. Wheel 12 is preferably plated on the side facing the energy source to reflect energy so that the wheel will absorb as little energy as possible. The other side of wheel 12 is blackened to improve the emissivity of the material and, thus, minimize blade heating.

When filter wheel 14 is rotated with respect to stationary wheel 12, there is provided a modulation of the incident radiation 16. All energy in the $\Delta\lambda_1$ band goes through the filter segments 20 essentially unmodulated as, of course, does that through the transparent sections 18. Actually, the energy in the $\Delta\lambda_1$ band exiting the stationary wheel will have some slight ripple, perhaps 10% or 15% thereon due to the difference in transmissibility between the filter segments 20 and the clear segments 18, since the filter segments 18 are not as transparent as segments 20 in the band $\Delta\lambda_1$.

Figure 2A:
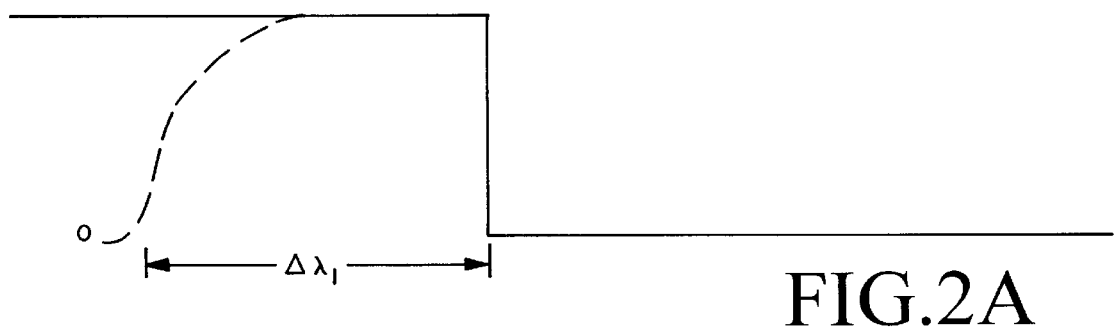
FIGS. 2A & B are sketchs illustrating the passbands of the filters employed in the modulator of FIG. 1.
Figure 2B:
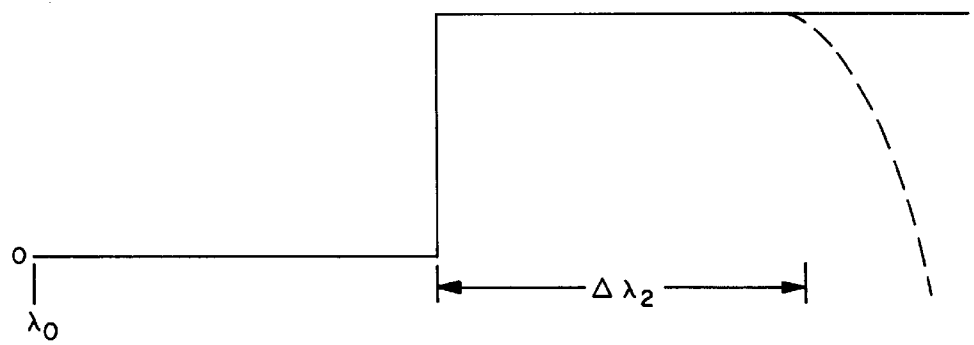

The energy in the $\Delta\lambda_2$ band as shown in diagram B of FIG. 2 is essentially blocked by the filter sections 20 of wheel 14, while energy in this band passes through the transparent sections 18. Thus, in conjunction with stationary wheel 12 there is provided substantially 100% modulation of the energy in the $\Delta\lambda_2$ band. This modulated signal essentially passes through wheel 10 undisturbed, as will be described hereinafter, to provide a signal substantially as shown in waveform A of FIG. 3.

Filter wheel 10 is made up of alternate radial segments 26 and 28. Segments 28 are transparent to both spectral wavelength bands of interest. Segments 26 have a transmission characteristic substantially as shown in diagram B of FIG. 2, that is, over the band $\Delta\lambda_2$, substantial amounts of radiation will pass through the segments 26 and shorter wavelengths will be blocked thereby.

Like filter wheel 14, filter wheel 10 is also made of a material which will pass both the desired bands, and again the segments 26 are constructed by deposition of filter materials to provide the desired transmission characteristics.

The $\Delta\lambda_1$ energy, which is essentially unmodulated by filter wheel 14, as described above, except for a slight ripple thereon, is modulated by the filter wheel 10 in conjunction with wheel 12. The $\Delta\lambda_1$ energy passes through the clear segments 28 while it is blocked by the filter segments 26, thus providing a signal substantially as shown in waveform B of FIG. 3.

Figure 4:
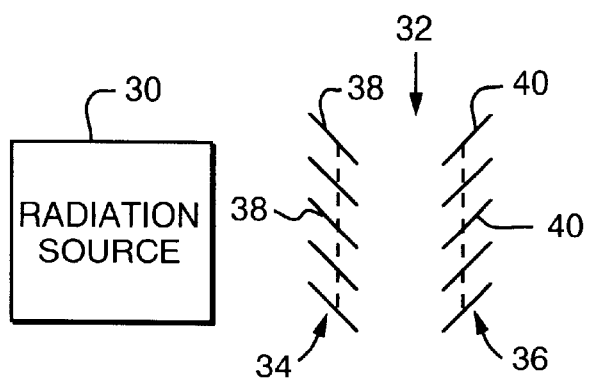
FIG. 4 is a sketch of another embodiment of a multiband modulator of utility in the practice of the present invention.

Although filter wheels have been shown in the embodiment previously described to obtain simultaneous amplitude modulation of a radiation source in two distinct spectral wavelength bands, this is only the preferred method of deriving this result. FIG. 4 illustrates an alternative arrangement.

Radiation from a source 30 is directed to a modulator 32 which comprises individual rotating vane type modulators 34 and 36 driven by motors 35 and 37 respectively. These rotating vane modulators are well known, however, in this embodiment the individual vanes 38 and 40 are constructed of materials which filter the radiation from the source 30 in a predetermined manner. For example, the vanes are constructed of quartz with a filter material deposited thereon. In the embodiment shown, modulator 34 includes vanes 38 having a transmission characteristic substantially as shown by diagram A of FIG. 2, and modulator 36 includes vanes 40 having a transmission characteristic substantially as shown by diagram B of FIG. 2.

Two distinct signals are provided by this arrangement in the manner previously described since the rotating vanes are substantially equivalent to the rotating and stationary wheel combinations previously described. When vanes 38 are orientated vertically, only $\Delta\lambda_1$ radiation will pass through the vanes, and when vanes 38 are rotated horizontally all radiation will pass through. Therefore, the modulator 34 provides radiation output of the type shown in waveform A of FIG. 3, although more rectangular in shape. Similarly, modulator 36 provides modulation of the type shown in waveform B of FIG. 3, although, again, more rectangular in shape.

Figure 3A:
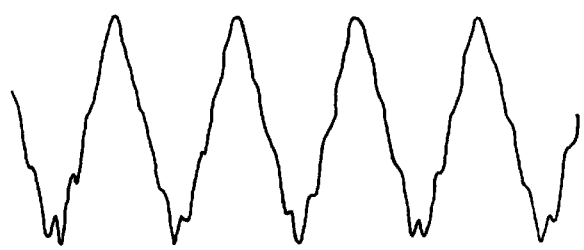
FIGS. 3A & B are sketchs showing the output from the modulator of FIG. 1 at two different spectral bands.
Figure 3B:
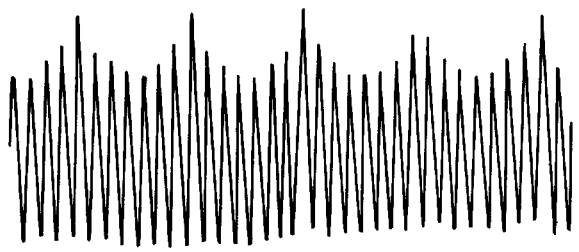
Figure 5A:
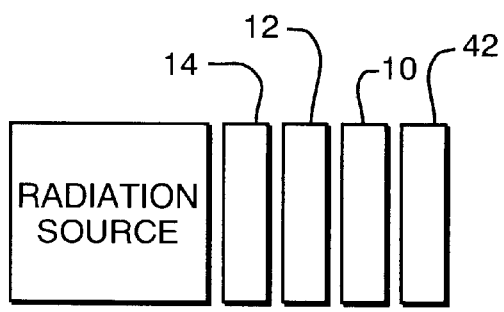
FIG. 5 is a sketch of a modification of the modulator of FIG. 1.
Figure 5B:

As mentioned previously, further superimposed modulation on either or both fundamental signals shown in FIG. 3 can be achieved by providing additional modulating members. This is illustrated in FIG. 5A where the output of radiation source 30 is directed to a modulation system comprising wheels 10, 12, 14 as previously described, as well as a further wheel 42. Wheel 42 is constructed in the same manner as wheels 10 and 14, and is used to further amplitude modulate one of the signals shown in FIG. 3 and preferably, that of the wheel which is the closer. For example, if it is desired to modulate the signal shown in waveform B of FIG. 3, then wheel 42 would have transmission characteristics similar to wheel 10.

It is obvious that wheel 42 could be replaced by a vane type modulator as shown in FIG. 4 and that various combinations of rotating vane and filter wheel modulators can be employed in the manner taught herein.

Figure 6:
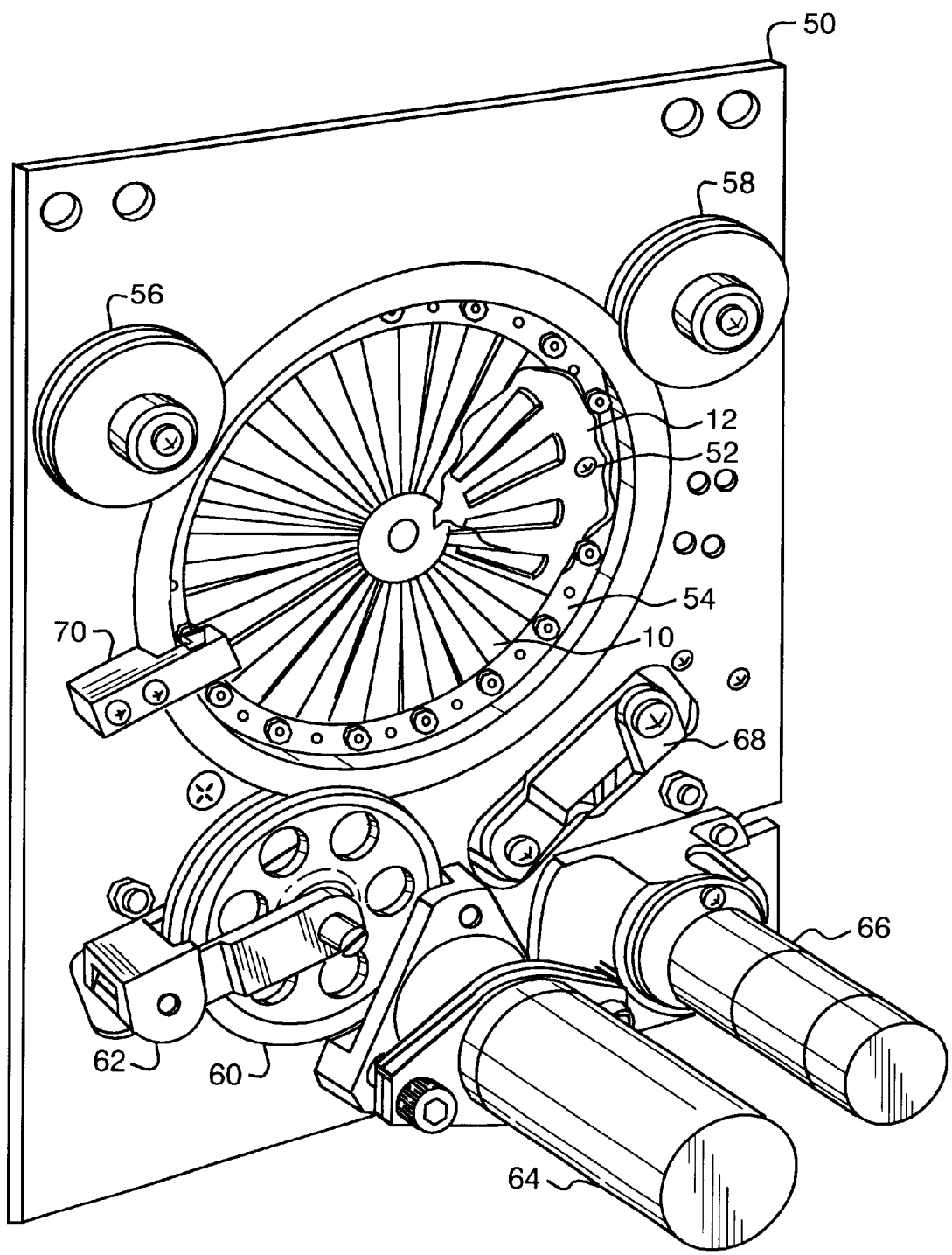
FIG. 6 is a pictorial representation illustrating a means for supporting and driving the modulator of FIG. 1.

FIG. 6 illustrates a reduction to practice of the multiple band mechanical modulator of FIG. 1. Stationary wheel 12 is mounted in a housing 50 using screws 52. The rotating wheels 10 and 14 are mounted on rings 54 and arranged on either side of stationary wheel 12. For clarity purposes, only one side of housing 50 is shown with wheel 10 arranged thereon. Wheel 14 is arranged similarly on the reverse side of the housing.

Wheel 10 is arranged in position on the housing by having the shoulder of ring 54 arranged in guide rollers 56, 58 and a spring loaded friction drive wheel 60. Constant pressure is maintained on the wheel 10 by a lever 62. The friction drive wheel 60 receives rotational energy from a motor 64 through a wheel on its shaft which is not shown in the Figure. Wheel 14 on the reverse side of the housing likewise receives power from a motor 66.

A magnetic pickoff 70 is arranged proximate the wheel 10 to act as a chopping frequency monitor. The magnetic pickoff operates in conjunction with at least one or more of screws 72 which is magnetic.

Arranged on the other side of the shafts of motor 64, 66 are a pair of corresponding tachometers which in a rate servo arrangement permit controlled speeds of the wheels 10 and 14 to produce a desired output frequency.

Referring now to FIGS. 7A–7C, there is illustrated thereby another embodiment of a multiple spectral band opto-mechanical modulator. This embodiment requires two filter wheels and no third wheel. Two identical filter wheels 80 and 82 are used to provide simultaneously two distinct amplitude modulators in two distinct wavelength bands. The filter wheels 80 and 82 are positioned so as to receive radiation 84. Wheel 82 is a rotating wheel while wheel 80 is a stationary wheel.

The wheels 80, 82 are shown in detail in FIG. 7A and include alternating first and second groupings of radial segments 86 and 88. Only one each of said groupings are illustrated; however, the wheel is completely filled with said alternating groupings. Groupings 86 comprise alternate radial segments 90 and 92.

Segments 90 are substantially opaque to both spectral bands of interest ($\Delta\lambda_1$ and $\Delta\lambda_2$). Segments 92 have a transmission characteristic substantially as shown in diagram A of FIG. 2, that is, over the band shown as $\Delta\lambda_1$ substantial amounts of radiation will pass through these segments while radiation of larger wavelengths will be blocked thereby.

Groupings 88 comprise alternate radial segments 93 and 94. Segments 93 have a transmission characteristic substantially as shown in diagram B of FIG. 2, that is over the band shown as $\Delta\lambda_2$ substantial amounts of radiation will pass through these segments while radiation of shorter wavelengths will be blocked thereby. Segments 94 are transparent to both 20 spectral bands of interest ($\Delta\lambda_1$ and $\Delta\lambda_2$).

In this arrangement no third wheel is required and two outputs are obtained as shown in FIG. 7C. The only drawback to this arrangement is that the frequencies of the two signals a and b are not completely independent of each other as in the earlier described embodiments. As in the manner of FIG. 5A additional means may be employed to further modulate one of the signals.

Although the modulators have been described in conjunction with a radiation source, it is obvious that they could also be used to modulate a signal into the detector of a receiver. Thus, it is to be understood that the embodiments shown are illustrative only and that many variations and modifications may be made without departing from the principles of the invention herein disclosed and defined by the appended claims.

We claim:

1. A multiple spectral band opto-mechanical modulator for obtaining simultaneous but independent modulation of radiation in at least first and second distinct wavelength bands, comprising:

first modulating means for passing energy in said first band essentially unmodulated and for providing substantial modulation of energy in said second band; and second modulating means receptive to the output of said first modulating means for passing said modulated energy in said second band substantially unchanged and for providing substantial modulation of energy in said first band.

2. Apparatus as recited in claim 1 wherein said first modulating means includes:

a first rotating wheel having alternating first and second radial segments, said first radial segments being substantially transparent to energy in said first and second bands, said second radial segments being substantially transparent to energy in said first band and substantially opaque to energy in said second band;

means for rotating said first wheel at a first predetermined frequency; and a stationary wheel positioned adjacent said first rotating wheel having alternating first and second radial segments, said first segments being substantially transparent to energy in said first and second bands, said second segments being substantially opaque to energy in said first and second bands.

3. Apparatus as recited in claim 2 wherein said second modulating means includes:

a second rotating wheel having alternating first and second radial segments, said first radial segments being substantially transparent to energy in said first and second bands, said second radial segments being substantially transparent to energy in said second band and substantially opaque to energy in said first band, said second rotating wheel being positioned adjacent said stationary wheel; and means for rotating said second wheel at a second predetermined frequency.

4. Apparatus as recited in claim 3 wherein said first rotating wheel comprises a transparent material having a first filter material thereon to form said second radial segments.

5. Apparatus as recited in claim 4 wherein said second rotating wheel comprises a transparent material having a second filter material thereon to form said second radial segments.

6. Apparatus as recited in claim 5 wherein said transparent material is selected from the group consisting of:
quartz;
glass; and
sapphire.

7. Apparatus as recited in claim 1 further including:

third modulating means coupled to said second modulating means for superimposing modulation on energy in one of said bands.

8. Apparatus as recited in claim 7 wherein said third modulating means includes:

a rotating wheel having first and second radial segments, said first radial segments being substantially transparent to energy in said first and second bands, said second radial segments being substantially transparent to energy in one of said bands and substantially opaque to energy in said other band; and means for rotating said wheel at a predetermined frequency.

9. Apparatus as recited in claim 7 wherein said third modulating means includes:

a rotating vane modulator having vanes substantially transparent to energy in one of said bands and substantially opaque to energy in the other of said bands; and means for driving said vane modulator.

10. Apparatus as recited in claim 1 wherein said first modulating means includes:

a first plurality of vanes mounted for rotation about a like first plurality of parallel axes disposed in substantially a single first plane, each axis separated from adjacent axes by a distance comparable to the width of said vanes, said vanes being substantially transparent to energy in said first band and substantially opaque to energy in said second band; and means for driving said first plurality of vanes.

11. Apparatus as recited in claim 10 wherein said second modulating means includes:

a second plurality of vanes mounted for rotation about a like second plurality of parallel axes disposed in substantially a single second plane, each axis separated from adjacent axes by a distance comparable to the width of said vanes, said vanes being substantially transparent to energy in said second band and substantially opaque to energy in said first band; and means for driving said second plurality of vanes.

12. A multiple band mechanical modulator for obtaining simultaneous modulation of radiation in at least first and second distinct wavelength bands, comprising:

first and second filter wheels each including a plurality of first and second groupings of radial segments;

said first groupings of radial segments having alternating first and second radial segments, said first radial segments being substantially opaque to energy in said first and second bands, said second radial segments being substantially transparent to radiation in said first band and substantially opaque to energy in said second band;

said second groupings of radial segments having alternating third and fourth radial segments, said third radial segments being substantially transparent to radiation in said second band and substantially opaque to energy in said first band, said fourth radial segments being substantially transparent to energy in said first and second bands, and means for rotating one of said filter wheels.

* * * * *